(12) United States Patent
Harmer

(10) Patent No.: US 6,567,887 B2
(45) Date of Patent: *May 20, 2003

(54) BUFFERING OF PARTITION TABLES, FILE SYSTEM DIRECTORY STRUCTURES AND INDIVIDUAL FILE CLUSTER CHAINS IN A MASS STORAGE DEVICE

(75) Inventor: Tracy D. Harmer, Erie, CO (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/476,575

(22) Filed: Jan. 3, 2001

(65) Prior Publication Data

US 2002/0152354 A1 Oct. 17, 2002

(51) Int. Cl.[7] .............................................. G06F 12/00
(52) U.S. Cl. ..................... 711/112; 711/170; 707/205
(58) Field of Search ..................... 711/112, 170–173; 712/206; 707/200–205

(56) References Cited

U.S. PATENT DOCUMENTS

| 5,390,318 A | * | 2/1995 | Ramakrishnan et al. ..... 711/158 |
| 5,778,374 A | * | 7/1998 | Dang et al. .................. 707/101 |
| 5,828,904 A | * | 10/1998 | Batson et al. .................. 710/58 |
| 5,835,955 A | | 11/1998 | Dornier et al. ............. 711/162 |
| 5,887,151 A | * | 3/1999 | Raz et al. .................... 712/206 |
| 5,893,140 A | * | 4/1999 | Vahalia et al. ............... 711/118 |
| 6,370,614 B1 | * | 4/2002 | Teoman et al. ............. 711/113 |
| 6,374,266 B1 | * | 4/2002 | Shnelvar ...................... 707/204 |

* cited by examiner

Primary Examiner—Do Hyun Yoo
Assistant Examiner—Nasser Moazzami
(74) Attorney, Agent, or Firm—W. Daniel Swayze, Jr.; W. James Brady; Frederick J. Telecky, Jr.

(57) ABSTRACT

A computer system for storing data includes a host computer having system RAM associated with the computer system, and a file directory peripheral bus connected to the host computer. A mass memory storage peripheral computer device is connected to said peripheral bus, the mass memory storage peripheral computer device having access to the file directory to locate data on the mass memory storage peripheral computer device.

4 Claims, 9 Drawing Sheets

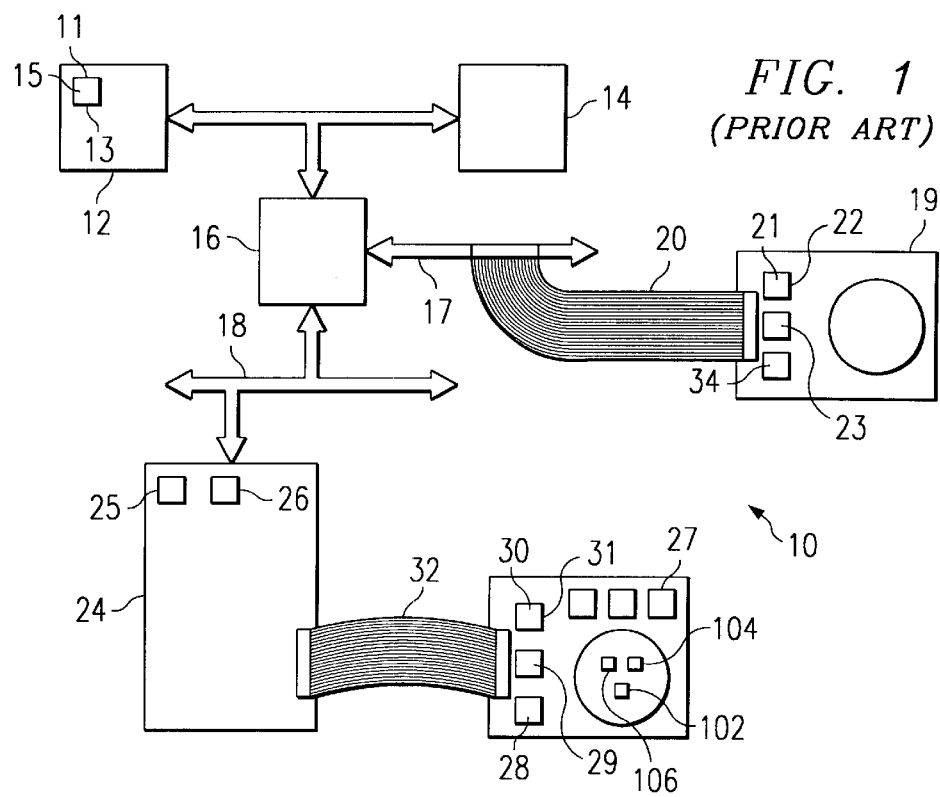
FIG. 1
(PRIOR ART)
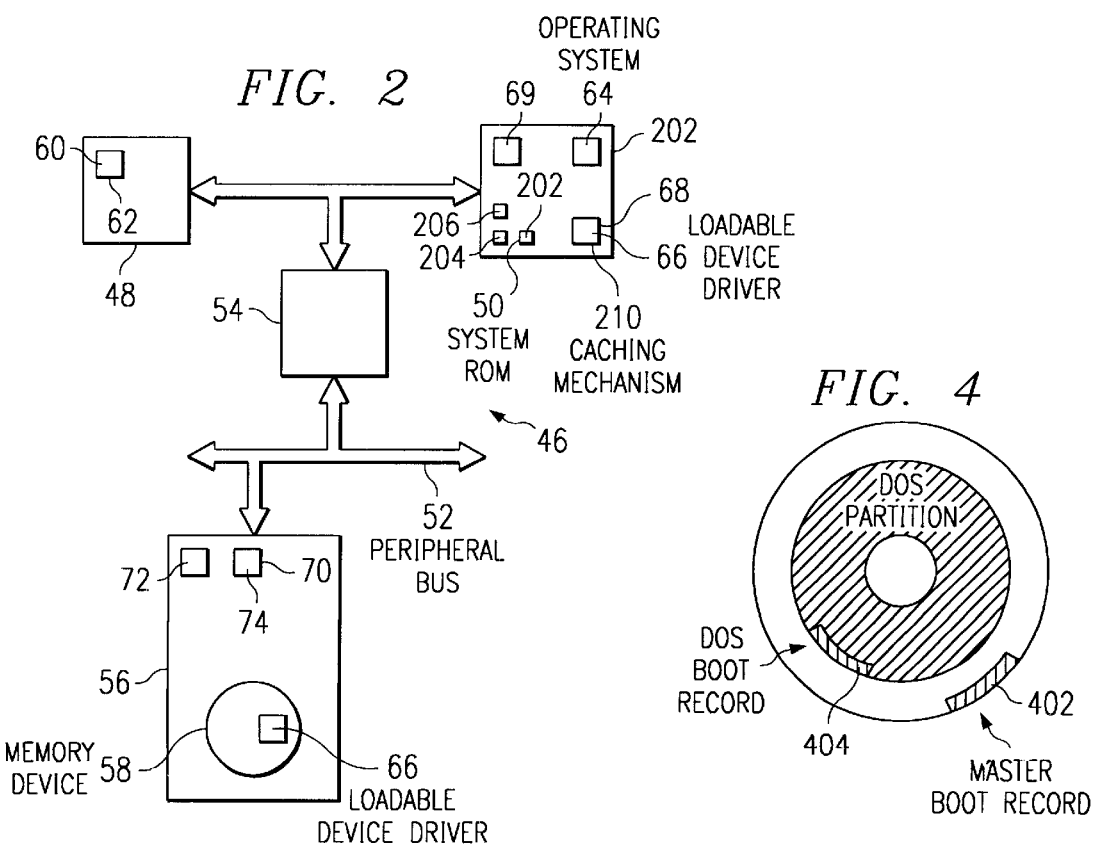
FIG. 2
FIG. 4

2.33. DIRECTORY ENTRIES

| | OFFSET | LENGTH | DESCRIPTION | FORMAT | COMMENTS |
|---|---|---|---|---|---|
| 602 | 0 (0) | 8 BYTES | FILE NAME** | ASCII CHARS | MUST BE PADDED WITH SPACES TO FILL FIELD |
| 604 | 8 (8) | 3 BYTES | FILE TYPE (EXTENSION) | ASCII CHARS | MUST BE PADDED WITH SPACES TO FILL FIELD |
| 606 | B (11) | BYTE | FILE ATTRIBUTE BYTE | BIT CODES: BIT 0 = READ-ONLY<br>BIT 1 = HIDDEN<br>BIT 2 = SYSTEM<br>BIT 3 = VOLUME LABEL<br>BIT 4 = DIRECTORY<br>BIT 5 = ARCHIVE<br>BIT 6 = UNUSED<br>BIT 7 = UNUSED | SEE 2.34. FILE ATTRIBUTE BYTE |
| | C (12) | 10 BYTES | RESERVED | | |
| 608 | 16 (22) | WORD | TIME FILE LAST UPDATED* | CODED WORD: (UNSIGNED 16-BIT INTERGER)<br>TIME = HR*2048+MIN*32+SEC÷2 | SEE 2.35. DATE/TIME FORMATS |
| 610 | 18 (24) | WORD | DATE FILE LAST UPDATED* | CODED WORD: (SEE ABOVE)<br>DATE = (YR-1980)*512+ MON*32+DAY | SEE 2.35. DATE/TIME FORMATS |
| 612 | 1A (26) | WORD | STARTING CLUSTER NUMBER* | WORD BINARY INTEGER* | SEE 1.15. COMMON 8086 FAMILY DATA FORMATS |
| 614 | 1C (28) | DBL WORD | FILE SIZE* | DOUBLE WORD BINARY INTEGER* | SEE 1.15. COMMON 8086 FAMILY DATA FORMATS |

FIG. 6

2.36. FAT LAYOUTS

12-BIT FAT LAYOUT

| ENTRY NUMBER | EXAMPLE VALUE | USE |
|---|---|---|
| 0 | FF8 | DISK ID BYTE |
| 1 | FFF | FILLER |
| 2 | 003 | CLUSTER VALUE: 000 = UNUSED CLUSTER |
| 3 | 004 | 001–FEF = NEXT CLUSTER NUMBER |
| 4 | 005 | FF0–FF6 = RESERVED CLUSTER |
| 5 | FFF | FF7 = CLUSTER MARKED BAD |
| 6 | 000 | FF8–FFF = LAST CLUSTER IN FILE |

RESERVED FOR DOS { 702

FROM DIRECTORY ENTRY'S STARTING CLUSTER NUMBER 704

NOTE: IN THIS EXAMPLE FAT, THE FIRST ENTRY INDICATES THAT IT IS A FAT FOR A HARD DISK (FF8). THE FIRST DIRECTORY ENTRY IN THE DIRECTORY FOR THAT DISK HAS A STARTING CLUSTER OF 2, THUS POINTING TO CLUSTER NUMBER TWO IN THIS TABLE. THE SECOND CLUSTER POINTS TO THE THIRD, THE THIRD TO THE FOURTH, THE FOURTH TO THE FIFTH. THE FIFTH CLUSTER IS THE LAST CLUSTER IN THE FILE, THUS HAS A VALUE OF FFFH. (CONTINUED)

FIG. 7

16-BIT FAT LAYOUT

| ENTRY NUMBER | EXAMPLE VALUE | USE |
|---|---|---|
| 0 | FFF8 | DISK ID BYTE |
| 1 | FFFF | FILLER |
| 2 | 0003 | CLUSTER VALUE: 0000 = UNUSED CLUSTER |
| 3 | 0004 | 0001-FFEF = NEXT CLUSTER NUMBER |
| 4 | 0005 | FFF0-FFF6 = RESERVED CLUSTER |
| 5 | FFFF | FFF7 = CLUSTER MARKED BAD |
| 6 | 0000 | FFF8-FFFF = LAST CLUSTER IN FILE |

RESERVED FOR DOS { 802

FROM DIRECTORY ENTRY'S STARTING CLUSTER NUMBER } 804

NOTE: IN THIS EXAMPLE FAT, THE FIRST ENTRY INDICATES THAT IT IS A FAT FOR A HARD DISK (FFF8H). THE FIRST DIRECTORY ENTRY IN THE DIRECTORY FOR THAT DISK HAS A STARTING CLUSTER OF 2, THUS POINTING TO CLUSTER NUMBER TWO IN THIS TABLE. THE SECOND CLUSTER POINTS TO THE THIRD, THE THIRD TO THE FOURTH, THE FOURTH TO THE FIFTH. THE FIFTH CLUSTER IS THE LAST CLUSTER IN THE FILE, THUS HAS A VALUE OF FFFFH. REMEMBER, WORDS IN THE FAT ARE BYTE SWAPPED (i.e., LEAST SIGNIFICANT BYTE FIRST).

SOURCE: IBM DOS 3.3 TECHNICAL REFERENCE, PAGES 5-5 TO 5-9

SEE ALSO: 2.37. DISK ID BYTES

FIG. 8

2.39. DISK PARTITION TABLE LAYOUT

| OFFSET | LENGTH | NAME | CONTENTS |
|---|---|---|---|
| 0 (0) | BYTE | PARTITION STATUS | 0=INACTIVE; 80H=BOOTABLE, ACTIVE |
| 1 (1) | BYTE | STARTING HEAD | BINARY VALUE |
| 2 (2) | WORD | STARTING SECTOR AND CYLINDER | SEE NOTE * |
| 4 (4) | BYTE | PARTITION TYPE | 1=DOS WITH 12-BIT FAT<br>4=DOS WITH 16-BIT FAT<br>5=EXTENDED DOS<br>6=RESERVED FOR FUTURE USE<br>DBH=CONCURRENT DOS |
| 5 (5) | BYTE | ENDING HEAD | BINARY VALUE |
| 6 (6) | WORD | ENDING SECTOR AND CYLINDER | SEE NOTE* |
| 8 (8) | DBL WORD | STARTING ABSOLUTE SECTOR | BINARY VALUE (LEAST SIGNIFICANT WORD FIRST AND BYTE SWAPPED IN EACH WORD) |
| C (12) | DBL WORD | NUMBER OF SECTORS | BINARY VALUE (LEAST SIGNIFICANT WORD FIRST AND BYTE SWAPPED IN EACH WORD) |

16-BYTE BLOCK REPEATS, AS ABOVE, FOR EACH PARTITION, AND IS FOLLOWED BY:

| 01FEH | WORD | SIGNATURE | 55AAH (INDICATES VALID BOOT RECORD) |
|---|---|---|---|

NOTES:
- SOME MANUFACTURERS ALLOW ADDITIONAL PARTITION TYPES IN ORDER TO DIVIDE LARGE CAPACITY HARD DISKS INTO SEVERAL DRIVES.
- THE PARTITION TABLES BEGIN AT AN OFFSET OF 1BEH IN THE BOOT RECORD. THE ACTUAL BOOT RECORD IS DEFINED BY THE STARTING HEAD, CYLINDER, AND SECTOR NUMBER, AND THAT SECTOR IS LOADED TO LOCATION 7C00H.

TO FIG. 9B

FIG. 9A 2.38. DISK BOOT RECORD LAYOUT

| OFFSET | LENGTH | DESCRIPTION | |
|---|---|---|---|
| 0 (0) | 3 BYTES | JMP TO BOOT CODE* | 1102 |
| 3 (3) | 8 BYTES | OEM NAME AND VERSION | 1104 |
| B (11) | WORD | BYTES PER SECTOR | 1106 |
| D (13) | BYTE | SECTORS PER CLUSTER (MUST BE A POWER OF 2) | 1108 |
| E (14) | WORD | RESERVED SECTORS (FOR DIR, FAT, ECT) | 1110 |
| 10 (16) | BYTE | NUMBER OF COPIES OF FAT | 1112 |
| 11 (17) | WORD | MAXIMUM NUMBER OF ROOT DIRECTORY ENTRIES | 1114 |
| 13 (19) | WORD | TOTAL NUMBER OF SECTORS IN LOGICAL IMAGE | 1116 |
| 15 (21) | BYTE | MEDIA DESCRIPTOR BYTE | 1118 |
| 16 (22) | WORD | NUMBER OF SECTORS IN FAT | 1120 |
| 18 (24) | WORD | NUMBER OF SECTORS PER TRACK | 1122 |
| 1A (26) | WORD | NUMBER OF HEADS | 1124 |
| 1C (28) | WORD | NUMBER OF HIDDEN SECTORS | 1126 |

VERSION INFO: • NOTE THAT MEDIA DESCRIPTOR BYTES ARE NOT NECESSARILY VALID BEGINNING WITH DOS 2.X
• *FOR DOS 2.X = 3-BYTE NEAR JUMP
   FOR DOS 3.X = 2-BYTE SHORT JUMP + NOP

NOTES: OEM NAME AND VERSION ARE NOT ALWAYS PRESENT (IBM DOES NOT USE)

SOURCE: IBM DOS 3.3 TECHNICAL REFERENCE, PAGE 2-31

SEE ALSO: 1.27. POWERS OF TWO

*FIG. 11*

2.41. HARD DISK FORMAT SUMMARY

| | XT | AT | MODEL 50 | MODEL 60 | MODEL 80 |
|---|---|---|---|---|---|
| SYSTEM THAT COMMONLY USES THIS FORMAT | | | | | |
| DISK SIZE | 5.25 | 5.25 | 3.5 | 3.5 | 3.5 |
| DISK ID BYTE (IN FAT)* | F8 | F8 | F8 | F8 | F8 |
| INTERLEAVE | 6 TO 1 | 3 TO 1 | 1 TO 1 | 1 TO 1 | 1 TO 1 |
| HEADS PER DISK | 4 | 4 | | | |
| CYLINDERS | 306 | 615 | | | |
| SECTORS PER TRACK | 17 | 17 | | | |
| BYTES PER SECTOR | 512 | 512 | 512 | 512 | 512 |
| SECTORS PER CLUSTER | 8 | 4 | | | |
| NUMBER OF RESERVED SECTORS | 1 | 1 | | | |
| NUMBER OF SECTORS PER FAT | 8 | 40 | | | |
| NUMBER OF FATS PER DISK | 2 | 2 | | | |
| NUMBER OF ROOT DIRECTORY SECTORS | 32 | 32 | | | |
| MAXIMUM NUMBER OF ROOT DIRECTORY ENTRIES ALLOWED | 512 | 512 | | | |
| TOTAL NUMBER OF SECTORS ON DISK | 20808 | 41820 | | | |
| TOTAL NUMBER OF USABLE SECTORS ON DISK | 20759 | 41707 | | | |
| TOTAL NUMBER OF USABLE CLUSTERS ON DISK | 2595 | 10427 | | | |
| CAPACITY OF DISK IN KILOBYTES | 10MB | 20MB | 20MB | 44MB | 70MB |
| FORMAT INTRODUCED WITH DOS VERSION | 2 | 2 | 3.3 | 3.3 | 3.3 |

NOTES:
- ALL NUMBERS ASSUME THAT THE ENTIRE HARD DISK IS FORMATTED AS A DOS PARTITION (i.e., NO NON-DOS PARTITIONS ON DISK).
- *FAT DISK ID BYTES ARE UNRELIABLE. USE DISK PARAMETER BLOCK TO DETERMINE MEDIA TYPE.

SOURCE: IBM PC/XT TECHNICAL REFERENCE, PAGES 1-151 TO 1-152.

SEE ALSO: 2.40. FLOPPY DISK FORMAT SUMMARY

*FIG. 12*

BUFFERING OF PARTITION TABLES, FILE SYSTEM DIRECTORY STRUCTURES AND INDIVIDUAL FILE CLUSTER CHAINS IN A MASS STORAGE DEVICE

FIELD OF THE INVENTION

The present invention relates generally to an arrangement of a mass memory storage peripheral computer device and method for operating a mass memory storage peripheral computer device, and more particularly to a method and arrangement for operating a mass memory storage peripheral computer device such as a hard disk drive connected to a host computer using a peripheral bus.

Pending U.S. patent application Ser. No. 08/553,024 is incorporated by reference in its entirety.

BACKGROUND OF THE INVENTION

During the development of the personal computer industry, the typical arrangements for operating a hard disk drive connected to a host computer have gone through a series of evolutions. When the personal computer was first developed, it was assumed that hard disk drives would be divided into cylinders, heads, and sectors which would clearly define each data sector in which information could be stored on the hard disk drive. Each of these data sectors could be directly addressed, however, operating systems and application programs needed a higher level method of addressing data being stored. Application programs work with data in the form of files. A file typically has a name associated with it, a size, the date it was created, the date it was last modified, etc.

When an application program reads or writes data from one of its files, it manipulates that file as if all of the data associated with that file is stored together. When an application program needs to open a file it does so by specifying the name of the file to the operating system. The operating system is responsible for taking the file name request from the application program and figuring out what sector or sectors on the mass storage device the file data is stored in. Operating systems perform this function through the use of file systems. A file system is a logical mapping of file names to the physical sectors on a mass storage device that the files data is stored in. The DOS operating system defined one such file system called the FAT 16 file system.

The FAT 16 file system uses a small portion of the physical storage space of a mass storage device to store the mapping information that allows the DOS operating system to find where data associated with a particular file is physically located on the mass storage device.

The FAT 16 file system consists of several parts. When a hard disk drive is initially setup for use within a computer it must first be partitioned. Part of this partitioning process is to create a Master Boot Record which divides the disk into one or more distinct areas. Inside the Master Boot Record there are pointers to each of these areas. The pointers typically specify the physical cylinder, head and sector that is the first sector for each defined area.

The operating system is responsible for setting up each one of these areas by defining, creating and storing the file system data that will be used to manage each particular partition on the disk. The file system data is typically created and written to the disk during the format process. During the format process for the FAT 16 file system, additional data is written to the disk. The first is the Boot Record for the partition. The Boot Record contains information about the file system being used in the current partition. For the FAT 16 file system it contains such information as the number of bytes per sector, the number of sectors per cluster, the number of copies of the FAT table, maximum number of root directory entries, the number of sectors used for each copy of the FAT table, etc. This information is the foundation of the file system being used in the current partition. It should be understood that there are many different types of file systems and the types of data stored in a particular file systems Boot Record could vary.

The next element stored on the disk for the FAT 16 file system is the File Allocation Tables (FAT). This table represents a grouping of sectors into what is called clusters. A Cluster is the minimum amount of space that can be allocated to any particular file. Furthermore, if more than one cluster is required then additional space is allocated one cluster at a time. Clusters are used to allocate space on the disk so that a pointer does not have to be maintained in a File Allocation Table like structure to chain individual sectors of a file together. Clusters make the management of file data more manageable.

The final element stored on the disk for the FAT 16 file system is the Directory Structure. The Directory structure is a table of entries that contains the files name along with information about when that file was created, how big the file is, the name of the file, along with the starting cluster for the file. The operating system will look through the Directory structure for a match on a file name. Once a match is found, the operating system can look to see what the starting cluster is and therefore where the actual data for the file starts at on the disk. Typically, all of this file system data, Boot Records, Directory Tables, Clusters, etc. are used by the operating system to keep track of reading and writing file data from the disk. Typically these are stored on the disk itself and the operating system reads and writes this data as necessary to manage its files stored on the disk.

Additionally, there are many other types of computer systems running UNIX, NetWare, or one of several other single-user or multi-user operating systems that have many different types of file systems. While each of these system may store and use different types of data for its particular file system, the overall concept is the same. The application programs make requests to open file with a file name. The operating system reads its specific file system data by using the file name provided by the application program to look up where that file starts on the disk. This information is still stored on the disk on a portion of the disks storage media, and is read by the operating system as it is needed in order to operate on files that are stored on that disk.

Referring to FIG. 1, a typical current computer system, generally indicated by reference numeral 10, includes an IDE hard disk drive, and a hard disk drive connected to the system using a SCSI adapter card and a PCI bus will be described. As shown in FIG. 1, system 10 includes a host computer module 12 referred to in the specification and claims as a host computer having system BIOS ROM 13 and system RAM 14. The system is operated using a system BIOS 15 and a translating BIOS 11 which are stored within system BIOS ROM 13. A host bridge 16 connects the host computer 12 to a ISA bus 17 and a PCI bus 18. A first hard disk drive 19 is connected to the ISA bus 17 using ribbon cable 20. Drive 19 includes disk drive firmware 21 stored on ROM 22 and disk drive controller 23 for controlling the operation of disk drive 19. A peripheral device in the form of a SCSI adapter card 24 is connected to the PCI bus 18 and includes a protocol translator 25 for translating all communications passing through the SCSI adapter card 24 between the PCI protocol of the PCI bus and the protocol of the adapter card, in this case SCSI protocol. Adapter card 24 also includes expansion BIOS ROM 26 which contains expansion BIOS for initializing adapter card 24 during the start-up of the system. System 10 further includes a second hard disk drive 27 which is connected to adapter card 24. Disk drive 27 includes a RAM memory buffer 28, a disk drive controller 29, and disk drive firmware 30 stored within ROM 31 for controlling the operation of the hard disk drive 27. Hard disk drive 27 is electrically connected to adapter card 24 using ribbon cable 32. Both hard disk drives 19 and 27 are divided into cylinder, head sectors, and zones which preferably define each data sector within the hard disk drives 19 and 27.

The disk drive typically includes file system data, such as cluster data 104, and a directory data 106 so that the location of files can be accessed on the disk. The directory 106 translates the file name to a starting cluster 104. The cluster 104 translates the cluster 104 to a sector 102 where the actual file data is located.

SUMMARY OF THE INVENTION

The present invention provides an arrangement for the method of operating a mass memory storage peripheral computer device and a system including a mass memory storage peripheral computer device where the file system data is cached and used out of host computer RAM instead of from the mass memory storage peripheral computer device.

BRIEF DESCRIPTION OF THE DRAWINGS

FIG. 1 illustrates a system;

FIG. 2 illustrates a system of the present invention;

FIG. 4 illustrates a boot record;

FIG. 6 illustrates the directory entries;

FIG. 7 illustrates a 12-bit FAT layout;

FIG. 8 illustrates a 16-bit FAT layout;

FIG. 11 illustrates a disk boot record layout; and

FIG. 12 illustrates a hard disk format summary.

DETAILED DESCRIPTION OF THE PRESENT INVENTION

Figure 3:
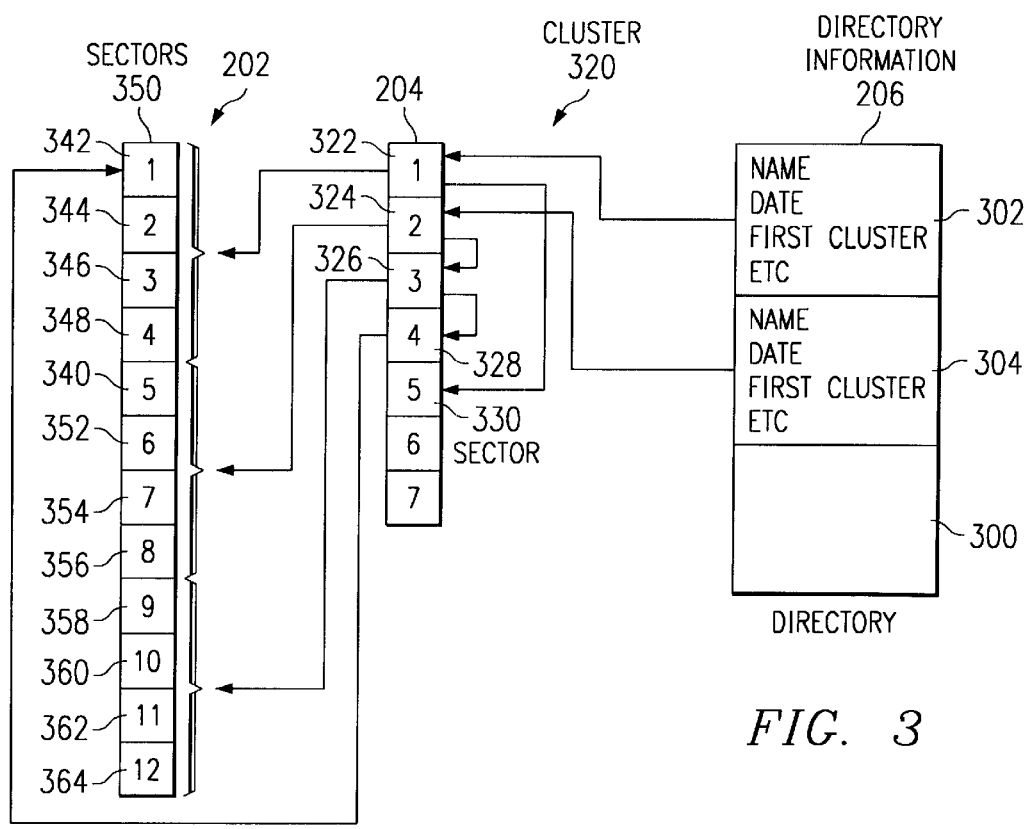
FIG. 3 illustrates the relationship between the directory clusters and sectors.

Referring to FIG. 2, a computer system designed in accordance with the present invention and designated generally by reference numeral 46 is described. Computer system 46 includes a host computer 48, system RAM 50, a peripheral bus 52, such as a PCI bus, a host bridge 54 connecting peripheral bus 52 to host computer 48 and system RAM 50 and a mass memory storage peripheral computer device 56 having a mass memory storage 58. Mass memory storage device 56 is connected to the host computer 48 using a peripheral bus 52. Host computer 48, system RAM 50, and host bridge 54 are made up of components which allow host computer 48 and RAM 50 to be connected to the peripheral bus 52 using host bridge 54. These components include but are not limited to a conventional 486, Pentium®, Power PC® or RISC-based components.

Although host computer 48, system RAM 50, and host bridge 52 are shown having a particular configuration relative to one another, it should be understood that this is not a requirement of the present invention. Instead, these components may be interconnected in a variety of specific configurations and still remain within the scope of the invention so long as the mass memory storage peripheral computer device 56 is connected to these components using peripheral bus 52 as described hereinafter.

Peripheral bus 52 may be any suitable and readily providable peripheral bus. One possible peripheral bus is a PCI bus. However, it should be understood that a wide variety of peripheral buses, such as other parallel buses, serial buses, or multiplexed buses would also fall within the scope of the present invention.

Referring to FIG. 2, mass memory storage peripheral computer device 56 is a hard disk drive, and memory storage 58 is the hard disk drive memory storage. The hard disk drive memory storage 58 of hard disk drive 56 is divided into conventional heads, cylinders, sectors, and zones which define the specific location within the memory storage 58 of each data storage location. Hard disk drive 56 includes a disk drive controller 72 and disk drive firmware 74 to control its operation.

Now that the basic configuration of system 46 has been described, the operation in connection with FIG. 2 will be described briefly for a given period of time when an application program 76 being run on the system makes a read/write request of the hard disk drive. When application 76 makes a read/write request using a file name, operating system 64 receives the request and determines the theoretical or logical data address at which the operating system 64 believes the data is stored within a partition on disk drive 56 in the same way as conventional systems. However, in accordance with the present invention, the caching mechanism 210 of loadable device driver 66 manages the storage, lookup and updating of the file system information directly out of system RAM 50.

Normally when an operating system receives a request to read a portion of a file, it must first determine where that file is located on the disk before it can even try to read the file. This is done by the operating system reading through the file names in a directory to try to find a match for the file name that had been requested. This is typically done by the operating system issuing a request to a disk drive to read one or more sectors of directory information directly from the drive. Once this data has been read from the drive, it can then be searched by the operating system for the file name that it is looking for. If the file name is not found then more sectors from the directory are read into memory by the operating system and then those directory entries are searched. Once the file has been found in the directory, the operating system reads the rest of that directory entry to determine what cluster the file starts at. If the information being read from the file is within this first cluster, then the operating system can determine by what cluster number it found in the directory entry, what sector it needs to start reading at to read the data from the file. However, if the data being read is not in the first cluster of sectors, then the operating system will have to read the cluster entry from the FAT table to determine where the next cluster is for this particular file. This continues until the cluster is found that contains the data being read and then the actual data can be read from the disk.

As can be seen from the above the disk must be read potentially many times by the operating system just to determine where to actually read the data that had been requested in the first place by the application program. Each of these I/O accesses to the disk takes time and slows down the overall performance of the system. These I/O accesses are taking place over some form if peripheral bus to the system, which today these busses operate much slower then the computers processor and memory. In addition the speed of reading and writing from/to a disk is also much slower than the computers processor and memory. The present invention eliminates the need to perform these I/O access and reads and writes from/to the disk during the requesting of data from an application program.

The loadable device driver 66 uses its internal caching mechanism 210 to find and supply the relevant file system data that is being requested by the operating system. The directory and cluster information is provided to the operating system essentially at the speed of memory. This eliminates potentially many reads from the disk in order just to start reading actual file data from the disk. The loadable device driver 66 is provided the file system data from its caching mechanism 210 by accessing file system, such as directory information 206, cluster information 204, directly from the memory in system RAM 50.

The present invention uses a caching mechanism 210 located on the host computer 46 advantageously because the host computer has knowledge of the other host activities. More particularly, the caching mechanism 210 has information of file directory structure, boot records, etc., and essential logical structure. Because caching mechanism 210 is part of loadable device driver 66, it was written for a particular operating system. It is known at the time that the loadable device driver 66 is written what file systems are supported by the operating system that it was designed for. This helps in being able to provide the support necessary within the caching algorithm to provide caching of the file system data because the number of file system that have to be supported is a known quantity. The caching mechanism 210 can also have knowledge about the internal details of each of the file systems that it supports, such as being able to find the individual partitions and understand the particular details of each of the different types of file systems that could be used by a particular operating system. Since the operating system puts a logical layer on the physical layout of the disk drive, how data is arranged and managed by that operating system is operating system specific. Thus a disk drive by itself does not know what type of partitioning, or file systems are being stored on it.

The present invention advantageously uses partitioning in connection with the lists of logical drives on a physical device. Thus, there are many or a plurality of partitions for a plurality of logical drives. For example, in a typical window operating system, there exists a C drive, a D drive, an E drive, and an F drive which are all connected to a physical device.

In each partition is additional information on how that partition is being used. For example, it contains information about additional boot records and additional information concerning file allocation tables. It may include information concerning groups, physical sectors, which are grouped into clusters.

A cluster is a logical group of physical sectors on the drive. There is a single entry in the FAT table for every cluster. Space is allocated one cluster at a time. Additionally, typically a second copy of the FAT file is kept but not used.

The directory structure points to the first entry in the File Allocation Table (FAT) to where the file begins on the disk drive.

Directory structures include such information as the file name, which is the name that the operating system has given the file. Thus, it is possible to add this address to the beginning of the logical partition to determine where the file is physically on a drive. When a file is updated, this information is subsequently updated. Before data is actually read from the disk, the location of the data must be determined. The cache of the system, for example the FAT table, the directory structure, and the boot records, maintain the prior logical layout of the drive for the cache within the caching algorithm.

With the present invention, it is no longer necessary to go to the drive to determine the location of the data to be written or read from the disk. It is only necessary for the loadable device driver 66 to access or query the caching mechanism 210 in order to determine this information. Correspondingly, in operation, the system receives a request to read or write data from the disk. The file directory is found that corresponds to the request by reading it from the caching mechanism 210 which maintains that data in host RAM. Next, the cluster is found that corresponds to the file directory, and normally a request is sent to the drive to request data from the FAT table, and that information is read from the disk.

The advantage of the present invention is that it speeds up access to the data. FIG. 3 illustrates the relationship between directory 300, cluster 320, and sector 330. Directory 300 includes, among other things, first directory 302 which includes name, date, and a pointer to first cluster 322. Additionally, directory 300 includes the name of a second directory 304, the date it was created, and the first cluster of the second file. The first directory 302 points to first cluster 322. The first cluster 322 points to the fifth cluster 330 since the second cluster 324, the third cluster 326, and the fourth cluster 328 have already been allocated. Thus, the fifth cluster 330 is the next cluster available. The second directory 304 includes a pointer to the first cluster of this file, which is the second cluster 324. The cluster 324 in turn points to third cluster 326. Likewise, additional directories within directory 300 would point to the remaining clusters. The cluster 320 points to various groups of sectors 340. In this example, first cluster 322 points to the first four sectors, namely 342 to 348, which includes sectors 344 and 346. In a similar fashion, cluster 324 points to sectors 350 to 356, which includes sectors 352 and 354. The third cluster 326 points to sectors 358 to 364, which includes sectors 360 and 362.

FIG. 4 illustrates DOS partition, which includes a master boot record 402 and a DOS boot record 404.

Figure 5:
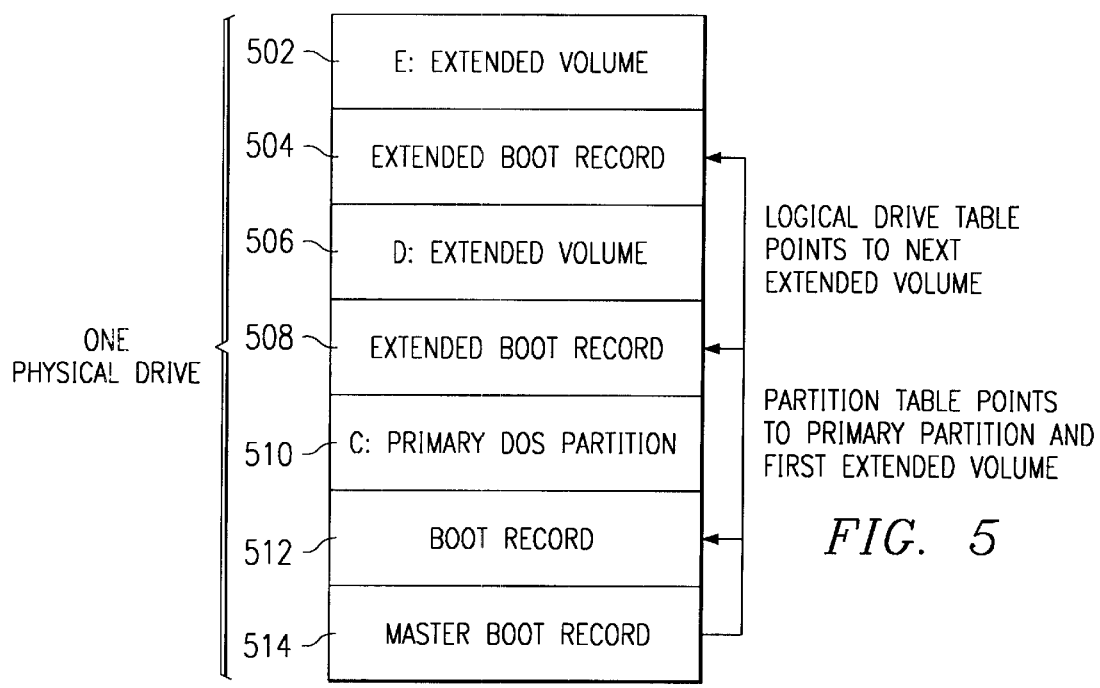
FIG. 5 illustrates the relationship between the records associated with one physical drive.

FIG. 5 illustrates one potential partitioning of a disk for a DOS system in conjunction with FIG. 4. One physical drive includes a master boot record 514, such as illustrated in FIG. 4, the boot record 512, such as illustrated in FIG. 4, a primary DOS partition 510 to point to the primary partition and first extended volume, an extended boot record 508, an extended volume 506, an extended boot record 504, and an extended volume 502. Each of the Boot records and associated volumes represent and contain file system specific information about the particular file system being used in each of the partitions.

FIG. 6 illustrates an example of directory entries that conceivably could be located within directory 300. The directory 600 includes a file name 602, which is the name of the file, a file type 604, which indicates the type of file, a file attribute byte 606, which is a special indicator of the type of directory entry, a time file last updated 608, which is the time that the file was last updated, a date file last updated 610, which is the date that the file was last updated, a starting cluster number 612, which is the entry in the cluster table 320, and a file size 614, which is an indication of the size of the file.

FIG. 7 illustrates a 12-bit FAT layout. This FAT table is the clusters 320. The FAT layout includes a disk ID byte 702 which is reserved for the operating systems use and a cluster value 704 to provide some information with respect to the cluster, for example, if the cluster is unused, the next cluster number, if the cluster is marked bad, and if it is the last cluster in the file.

FIG. 8 illustrates a 16-bit FAT layout, which is similar to the 12-bit FAT layout, including a disk ID byte 802 and a cluster value 804.

Figure 9B:
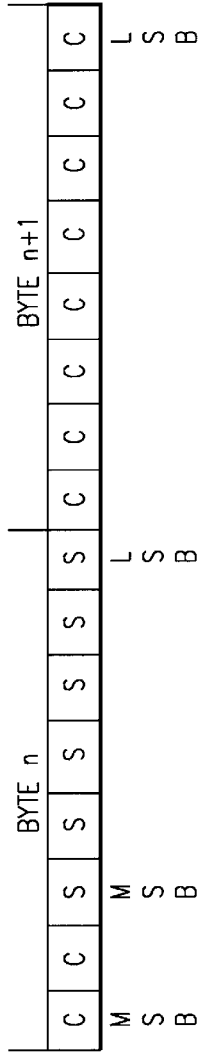
FIG. 9 illustrates a disk partition table layout.

FIG. 9 illustrates a disk partition table layout. The partition status 902 provides an indication if the partition is inactive, bootable, or active. The starting head 904 indicates the logical head the partition starts on. The starting cylinder and sector 906 indicates the address of the starting position of the sector and cylinder. The partition type 908 indicates the type of partition (12-bit FAT, 16-bit FAT, etc.). The ending head 910 is the logical head that the partition ends on. The ending sector and cylinder 912 is the address of the last sector and cylinder. The starting absolute sector 912 is the physical LBA that the partition starts at. The number of sectors 916 is the number of sectors in the partition.

Figure 10:
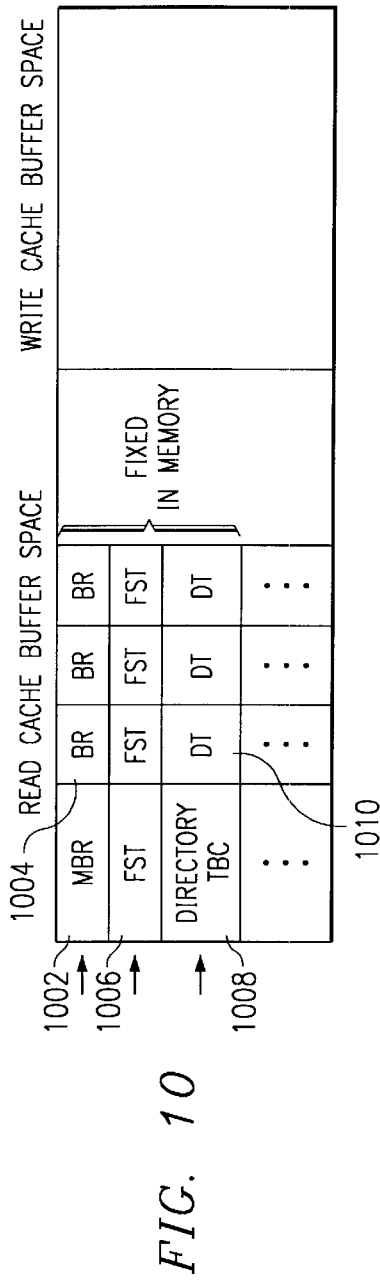
FIG. 10 illustrates details for a read cache.

As illustrated in FIG. 10, the caching mechanism manages a portion of host memory for caching file system data. One particular way that this data can be managed by the caching mechanism is for it to use some of the space from its read cache host RAM. However, the cached file system data could also be stored either in a portion of the caching mechanisms write cache buffer host RAM or in an entirely separate area of host RAM could be used to cache the file system data. Where the file system data is cached in host RAM does not matter, so long as the caching mechanism has read and write access to that host RAM memory. In this case, we are going to describe the use of the read cache RAM to cache the file system data. In this example, the read cache buffer space includes an area for storing file system data. This includes a master boot record 1002. The read cache buffer space includes boot records 1004. The read cache buffer space also includes file system pointer (FST) 1006 to point to the clusters 320. Additionally, the read cache buffer space includes directory table pointer 1008 to point to the directory table 300. The directory tables 1010 are those found in directories 300.

FIG. 11 illustrates a disk boot record layout. The JMP to boot code 1102 provides a displacement to the boot code. The OEM name and version 1104 is the name of the computer company or operating system company. The disk boot record layout includes bytes per sector 1106 which is the number of bytes per sector, sectors per cluster 1108 which is the number of sectors per cluster, reserved sectors 1110, number of copies of FAT 1112, maximum number of root directory entries 1114, total number of sectors in logical image 1116, media descriptor byte 1118 which is an identification byte, number of sectors in FAT 1120, and number of sectors per track 1122. Additionally, the disk boot record layout includes number of heads 1124 and number of hidden sectors 1126.

FIG. 12 illustrates the hard disk format summary. The hard disk format summary includes disk size 1202, disk ID byte (in FAT) 1204, interleave information 1206, heads per disk 1208, cylinders 1210 which is the number of logical cylinders in this partition, sectors per track 1212, bytes per sector 1214, sectors per cluster 1216, number of reserved sectors 1218, number of sectors per FAT 1220, number of FATs per disk 1222, number of root directory sectors 1224, maximum number of root directory entries allowed 1226, total number of sectors on disk 1228, total number of usable sectors on disk 1230, total number of usable clusters on disk 1232, capacity of disk in kilobytes 1234, and the format introduced with the DOS version 1236 to provide some level of version information.

By caching the file system data using the caching mechanism 210 of loadable device driver 66 the overall performance of the computer system is improved due to less I/O being required to satisfy a file read or write request from an application program. Furthermore, having the file system caching mechanism integral with the normal read and write data caching mechanisms of the loadable device driver 66 provides streamlined caching out of host RAM for all disk data being cached. This helps to reduce the cost of the mass storage peripheral device by reducing the amount of RAM that is necessary to be put on the mass storage peripheral device while at the same time utilizing the fastest possible storage medium within the computer system, host RAM, to store the cached data. System performance can be greatly improved with a decrease in overall cost.

What is claimed is:

1. A computer system for storing data, comprising:

a host computer having system RAM associated with said computer system, and a file directory having location data to locate data on a mass memory storage peripheral computer device;

a peripheral bus connected to said host computer; and said mass memory storage peripheral computer device connected to said peripheral bus;

wherein said mass memory storage peripheral computer device accesses said file directory and obtains said location data to locate data on said mass memory storage peripheral computer device.

2. A computer system for storing data, as in claim 1, wherein said file directory includes clusters.

3. A computer system for storing data, as in claim 1, wherein said file directory includes sectors.

4. A computer system for storing data, as in claim 1, wherein said peripheral bus is a PCI bus.

* * * * *

UNITED STATES PATENT AND TRADEMARK OFFICE
CERTIFICATE OF CORRECTION

PATENT NO.    : 6,567,887 B2
DATED         : May 20, 2003
INVENTOR(S)   : Tracy D. Harmer It is certified that error appears in the above-identified patent and that said Letters Patent is hereby corrected as shown below:

<u>Title page,</u>
Item [22], please delete "[22] Filed: Jan. 3, 2001" and insert -- [22] Filed: Jan. 3, 2000 --

Signed and Sealed this

Twenty-first Day of October, 2003

JAMES E. ROGAN
*Director of the United States Patent and Trademark Office*